United States Patent [19]

Fickling et al.

[11] Patent Number: 5,160,541
[45] Date of Patent: Nov. 3, 1992

[54] DOUBLE-COATING CUP

[75] Inventors: Peter R. Fickling; Sven-Erik Sundberg, both of Hudiksvall; Mats H. Ericsson, Delsbo, all of Sweden

[73] Assignee: Telefonaktiebolaget L M Ericsson, Stockholm, Sweden

[21] Appl. No.: 715,586

[22] Filed: Jun. 14, 1991

[30] Foreign Application Priority Data

Jun. 21, 1990 [SE] Sweden ............................ 9002227-8

[51] Int. Cl.$^5$ .............................................. B05C 3/15
[52] U.S. Cl. ................................... 118/405; 118/420; 118/DIG. 18; 118/DIG. 19
[58] Field of Search ............... 118/405, 420, DIG. 18, 118/DIG. 19, DIG. 22; 427/434.6, 434.7; 425/113, 133.1

[56] References Cited

U.S. PATENT DOCUMENTS

| 2,893,056 | 7/1959 | Henning | 118/405 |
| 4,474,830 | 10/1984 | Taylor | 427/54.1 |
| 4,510,884 | 4/1985 | Rosebrooks | 118/405 |
| 4,533,570 | 8/1985 | Iyengar | 118/405 |
| 4,688,515 | 8/1987 | Rosebrooks | 118/405 |
| 4,765,271 | 8/1988 | Jochem et al. | 118/405 |
| 4,982,688 | 1/1991 | Rothen | 118/420 |
| 5,031,568 | 7/1991 | Milliman | 118/420 |

FOREIGN PATENT DOCUMENTS 0114346 12/1983 European Pat. Off. .
0306329 9/1988 European Pat. Off. .

Primary Examiner—Michael G. Wityshyn
Attorney, Agent, or Firm—Burns, Doane, Swecker & Mathis

[57] ABSTRACT

A double-coating cup for applying two protective coatings simultaneously to an optical fiber includes a body having an bore formed therein and provided with a plurality of first and second coating-material inlet channels. A die holder is positioned in the bore in the body and the outer surface of the die holder has first and second slots formed therein positioned opposite the first and second coating-material inlet channels, respectively. The die holder also has first and second radial bores formed therein which communicate with the first and second slots, respectively. A guide die having a bore formed therein is positioned in the bore in the die holder and has a bore formed therein. First and second die nozzles and an intermediate die guide positioned therebetween are disposed in the die holder bore. The first die nozzle is positioned relative to the guide die so as to form a first coating-material slot between facing end faces of the guide die and the first die nozzle, and the second die nozzle is positioned relative to the guide die so as to form a second coating-material slot between facing end faces of the guide die and the second die nozzle. The first die nozzle has distribution channels formed therein which communicate the first radial bores with the first coating-material slot and the second die nozzle includes distribution channels formed therein which communicate the second radial bores with the second coating-material slot.

16 Claims, 2 Drawing Sheets

DOUBLE-COATING CUP

TECHNICAL FIELD

The present invention relates to a double-coating cup for coating an optic fibre with two protective layers simultaneously, said cup comprising a body having a frusto-conical boring formed axially therein, wherein the largest diameter of said boring lies on the inlet side of the fibre, and a die holder which is pressed firmly in the body and has a frusto-conical outer side surface corresponding to said boring, and further comprising two die nozzles inserted in the die holder for the application of said two layers of coating material.

BACKGROUND ART

Coating cups used to coat an optical fibre with two coating layers simultaneously are known to the art. These coating cups include radially extending slots or frusto-conical borings through which the coating material is applied on to the fibre. The drawback with these known coating cups is that centering of the fibre in the coating material is unreliable. An additional drawback with such known coating cups is that their construction is often complicated, resulting in handling difficulties when carrying out maintenance work and when cleaning the cups, for example.

DISCLOSURE OF THE INVENTION

The object of the present invention is to avoid the drawbacks associated with earlier known coating cups and to provide a double-coating cup of simple construction which can be readily dismantled for cleaning or like purposes, and to ensure that the two coating layers will be applied onto the fibre with precision such that the fibre will lie fully concentrically in the protective layers, and that coating of the fibre can be effected so that the fibre is centred in the cup-body without risk of wear through contact with the different die nozzles.

Thus, an inventive double-coating cup has the advantage of providing a double-coated fibre of very precise diameter and concentricity. Another advantage is that the cup is of simple construction and can be readily handled and maintained.

Other objects of the invention and further advantages afforded by the inventive double-coating cup will be evident from the following description, in which the invention is described in more detail with reference to a preferred exemplifying embodiment thereof and also with reference to the accompanying drawings.

BEST MODE FOR CARRYING OUT THE INVENTION

Figure 1:
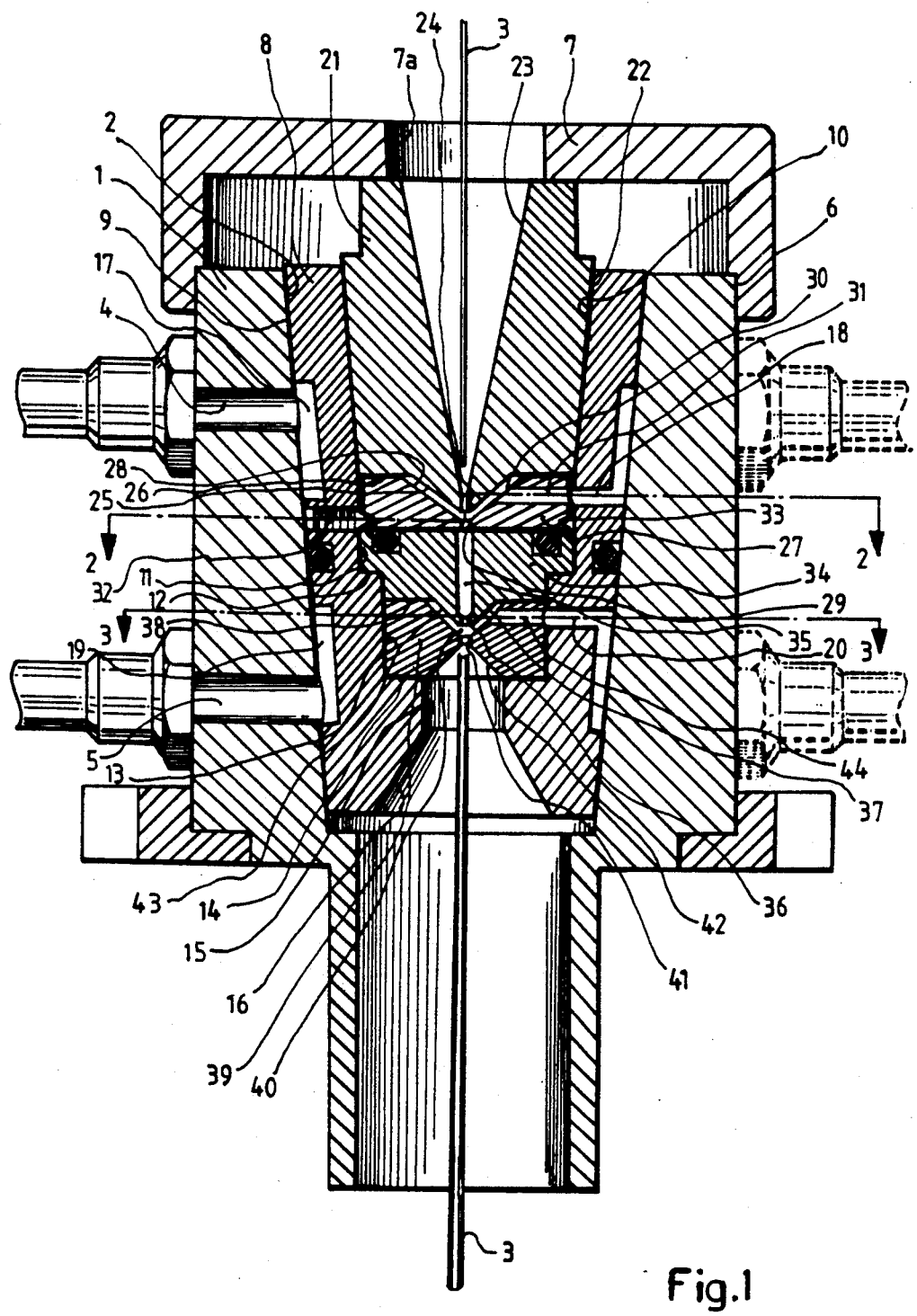
FIG. 1 is an axial section view of an inventive double-coating cup taken on the line 1—1 in FIGS. 2 and 3.

The double-coating cup illustrated in FIG. 1 includes a body 1 in which there is formed a truncated, conical boring 2 whose largest diameter is located on the inlet side at which a fibre 3 to be coated with two protective layers of coating material is introduced into the cup. The body 1 has two first inlet channels 4, which are diametrically opposed to one another at a first axial distance from said inlet side, and two second inlet channels 5 which are arranged axially spaced from the inlet side and located axially beneath the inlet channels 4. The inlet channels 4 and 5 are connected to pressurized containers containing the two coating materials, by means of nipples and hoses in a manner not shown. On the inlet side, the body is also provided with an externally screw-threaded part 6 for coacting with a holding nut 7 having a central opening 7a for the incoming fibre 3 and for firmly holding the parts of said body 1, in a manner described in more detail below.

Figure 2:
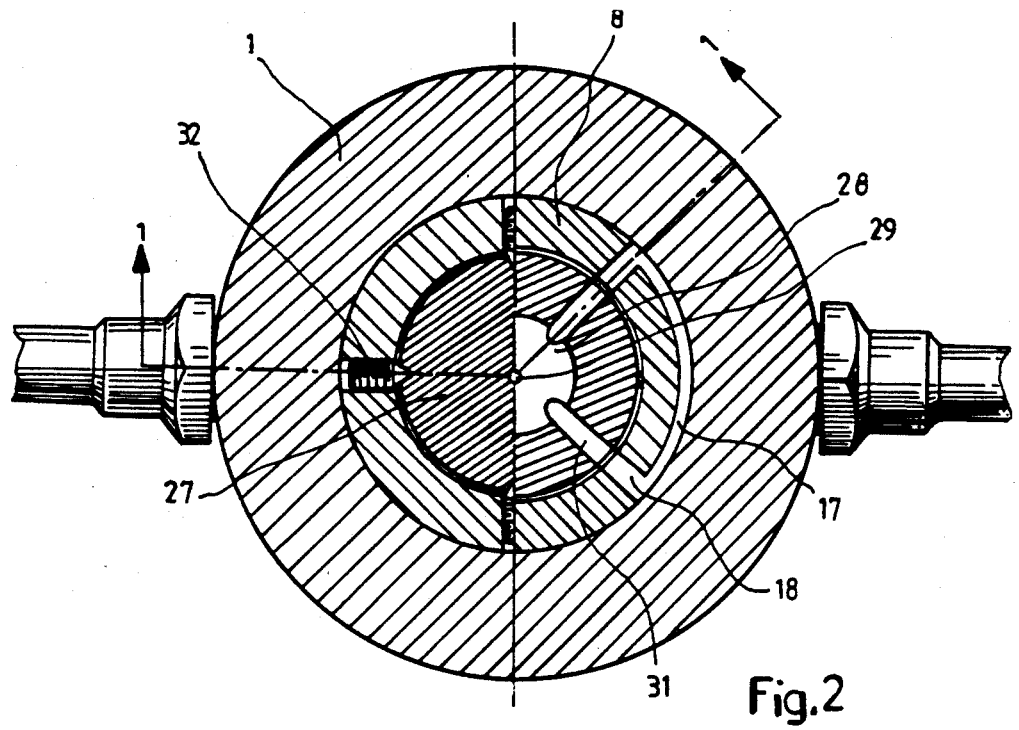
FIG. 2 is a cross-sectional view of the double-coating cup taken on the broken line 2—2 in FIG. 1.
Figure 3:
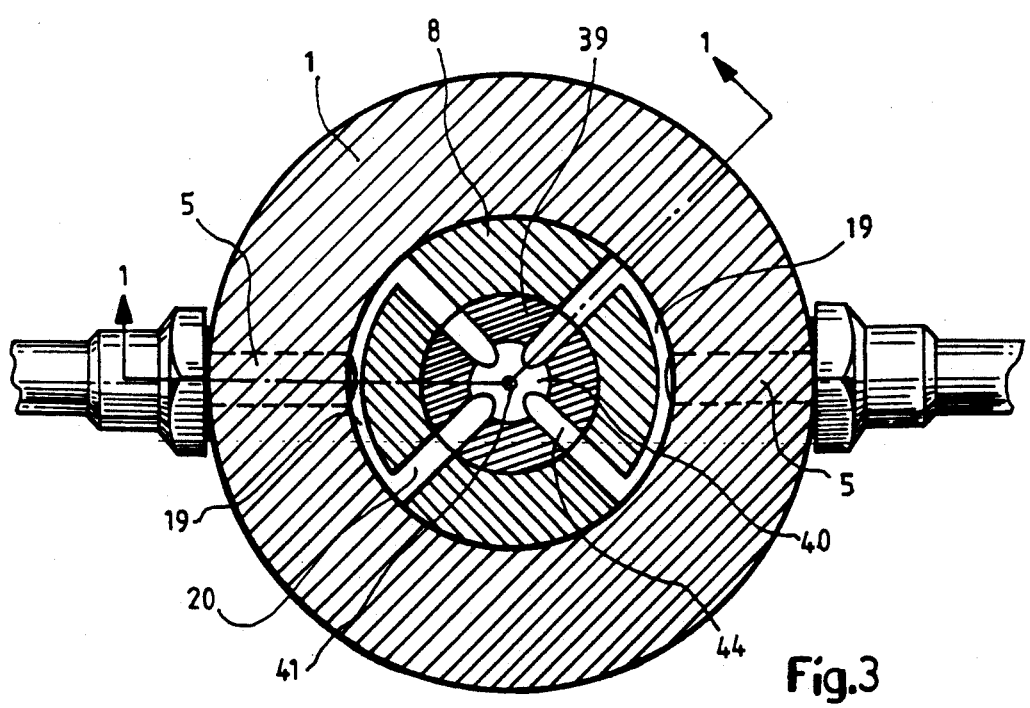
FIG. 3 is another cross-sectional view of the double-coating cup taken on the line 3—3 in FIG. 1.

A die holder 8 having a frusto-conical outer surface 9, corresponding to the boring 2, is inserted in the body 1. The die holder 8 is provided with a frusto-conical boring 10 which merges with a first cylindrical boring 11. There then follows a first shoulder 12, a second cylindrical boring 13 whose diameter is smaller than the diameter of the boring 11, a second shoulder 14 and a third, still smaller cylindrical boring 15. This latter boring is followed by a frusto- conical outlet boring 16. The outer surface 9 of the die holder 8 has formed therein first ring-shaped slots 17 which lie opposite the coating material entering through the inlet channels 4 and which form material distribution channels, said slots extending roughly through one-quarter of a circle around the die holder, as illustrated clearly on the right of FIG. 2. As will also be seen from FIG. 2, the slots 17 connect with first radial borings 18 which open into the junction between the frusto-conical boring 10 and the first cylindrical boring 11. The illustrated embodiment includes four radial borings 18 which are mutually spaced at 90° so as to distribute the coating material uniformly around the fibre, as will be described in more detail herebelow. Provided on the die holder 8 opposite the inlet channels 5 are second ring-shaped slots 19 which form distribution channels for the second coating material and which also extend through roughly one-quarter of a circle around the die holder and connect with second radial borings 20, as illustrated in FIG. 3, these borings 20 opening into the second cylindrical boring 13. These borings 20 are also four in number and are spaced mutually at 90° in order to uniformly distribute the second coating material.

Fitted loosely into the conical boring 10 of the die holder 8 is a fiber inlet guide die 21. The guide die has an external, frusto-conical surface 22 which corresponds to the shape of the boring 10 and also has a frusto-conical inlet boring 23 which functions to guide the optical fibre into the double-coating cup, this boring 23 merging with a cylindrical guide-boring 24 which opens into a frusto-conical outwardly directed part 25 of the lower end-wall 26 of the guide die.

A first cylindrical die 27 is fitted loosely into the first boring 11 of the die holder. The die 27 has a frusto-conical recess 28 which merges with a cylindrical nozzle-boring 29, and which is arranged so as to form a gap 30 between the recess 28 and the outwardly extending part 25 of the guide die. Radial borings 31 in the die open into the recess 28, and therewith into the gap or slot 30, these borings being disposed opposite the first borings 18 in the die holder, as clearly shown in FIG. 2. The borings 31 function to distribute the first coating material uniformly in the gap 30 around the incoming fibre 3 causing, at the same time, the fibre to be accurately centered in the die and coated uniformly with coating material. As beforementioned, the die or nozzle 27 is fitted loosely into the die holder 8 and is held and centered in said holder by means of screws 32, the tips of which lie in a circular groove 33 provided in the die.

Located beneath the first die 27 is a cylindrical intermediate die 34 which is press-fitted into the first boring 11 in abutment with the first shoulder 12. The guide die 34 has a cylindrical boring 35 which merges with a narrower guide-boring 36. This guide-boring opens into a frusto-conical outwardly extending part 37 in the bottom end-wall 38 of the guide die.

A second cylindrical die 39 is press-fitted into the second boring 13 of the die holder 8, in abutment with the second shoulder 14. The die has a frusto-conical recess 40 which merges with a cylindrical die-boring 41 and a frusto-conical outlet boring 42. The die 39 is arranged in a manner to form a gap or slot 43 between the outwardly extending part 37 of the intermediate die 34 and the recess 40. Radial borings 44 open into the recess 40, and thus also into the gap 43, in the same manner and for the same reason as that described above with reference to the die 27, as illustrated in FIG. 3, so as to distribute the second coating material uniformly around the fibre 3 coated with the first coating material, causing the fibre to be centered in the die and coated uniformly with the second coating material.

The full extension of the fibre 3 through the various die borings has not been shown in FIG. 1, for the sake of clarity. The Figure does show, however, the manner in which a pair of sealing rings is arranged to prevent the throughflow of coating material between the two die nozzles 27 and 39. Thus, one sealing ring is provided in a groove in the nozzle holder 8, between the ring-shaped slots 17 and 19, and one sealing ring is arranged in a groove in the intermediate guide die 34, against the lower end-wall of the first die nozzle 27. The Figure also shows that the body is provided with a cylindrical, downwardly protruding sleeve which surrounds the exiting fibre coated with said two coating materials.

As before mentioned, the coating material used is preferably a UV-curing acrylate, although other materials may be used, of course. The acrylate may be admixed with a UV-hardening paint, so as to incorporate a cable-coding or cable-marking colour in the protective coating. The double-coating cup may also be used to effect a separate colour-coating or colour-marking operation, by drawing a coated fibre once more through the body, the coating material in this case consisting of a paint, preferably a UV-hardening paint, instead of acrylate.

It will be understood that the invention is not restricted to the aforedescribed and illustrated embodiment thereof and that modifications can be made within the scope of the following claims.

We claim:

1. A double-coating cup for applying two protective coatings simultaneously to an optical fiber, comprising: a body having a fiber inlet side at which a fiber is to be introduced, said body being provided with an axially extending, frusto-conical boring whose largest diameter is located on the fiber inlet side; a die holder firmly pressed into the body and having a frusto-conical outer surface which corresponds in configuration to the boring in the body; and two die nozzles inserted in the die holder and functioning to apply two layers of coating material to an optical fiber, the body having two diametrically opposed first coating-material inlet channels spaced at a first axial distance from the inlet side, and two diametrically opposed second coating-material inlet channels spaced at a second axial distance from said inlet side, the die holder having a frusto-conical boring whose largest diameter lies on the fiber inlet-side, a first cylindrical boring which is a continuation of the conical boring, a first shoulder, a second smaller cylindrical boring, a second shoulder, and a third smallest cylindrical boring, an outer surface of the die holder having first ring-shaped slots located opposite the first inlet channels and first radial borings which connect with said ring-shaped slots and which open into a junction between the frusto-conical boring and the first cylindrical boring, and second ring-shaped slots which are located opposite the second inlet channels and which connect with second radial borings which open into the second cylindrical boring; an inlet guide die having a frusto-conical outer surface, the guide die being positioned in the conical boring of the die holder and including a frusto-conical inlet boring which merges with a cylindrical guide boring in a frusto-conical outwardly projecting part in an outlet end-wall of said guide die; said two die nozzles including first and second cylindrical die nozzles, said first cylindrical die nozzle having a frusto-conical recess which merges with a cylindrical nozzle boring, said first cylindrical die nozzle being positioned in the first cylindrical boring in a manner such as to form a first coating-material slot between the first die nozzle and the guide die, said first die nozzle being provided with distribution channels which connect with the first radial boring and which function to distribute a first coating material around the fiber and therewith center the fiber in the first die nozzle; a cylindrical intermediate guide die provided with a cylindrical boring, said intermediate guide die being positioned against the first shoulder and having a frusto-conical outwardly projecting part in an outlet end-wall of said intermediate guide die; said second cylindrical die nozzle having a frusto-conical recess which merges with a cylindrical nozzle boring said second cylindrical die nozzle being positioned in the second cylindrical boring and in abutment with said second shoulder in a manner such as to form a second coating-material slot between the second die nozzle and the intermediate guide die, said second die nozzle having distribution channels which connect with the second radial borings and which distribute a second coating material around the fiber coated with said first coating material and therewith center the fiber in said second die nozzle.

2. A cup according to claim 1, wherein the distribution channels in the first and second die nozzles are formed by circumferentially disposed and uniformly spaced radial borings which open into the frusto-conical recesses in the first and second die nozzles.

3. A cup according to claim 2, wherein the intermediate guide die is provided with a sealing ring axially disposed against the first die nozzle, said cup further including a sealing ring mounted on an outer surface of the die holder between the first and the second radial borings.

4. A cup according to claim 3, wherein the first die nozzle is loosely fitted into the first cylindrical boring and is firmly held and centered in the die holder by means of screws.

5. A cup according to claim 4, wherein the intermediate guide die is press-fitted in the first boring and the second die nozzle is press-fitted in the second cylindrical boring.

6. A cup according to claim 5, wherein the body is provided with a screw thread on the inlet side that engages a holding nut provided with an opening and lying in abutment with the inlet guide die.

7. A cup according to claim 1, wherein the body is provided on the inlet side with a screw thread that engages a holding nut provided with an opening and lying in abutment with the inlet guide die.

8. A double-coating cup for applying two protective coatings simultaneously to an optical fiber, comprising:

a body having a fiber inlet side at which a fiber to be coated is introduced, said body having an axially extending tapering bore formed therein that decreases in size from a large end adjacent the fiber inlet side, said body having a plurality of first coating-material inlet channels extending therethrough that are spaced from the fiber inlet side by a first distance and a plurality of second coating-material inlet channels extending therethrough that are spaced from the fiber inlet side by a second distance;

a die holder positioned in the bore in the body and having an axially extending bore formed therein, a portion of the bore in the die holder being tapered so as to decrease in size form one end of the die holder located closest tot he fiber inlet side of the body, an outer surface of the die holder having first slots formed therein which are positioned opposite the first coating-material inlet channels and first radial bores formed therein which are in communication with the first slots, the outer surface of the die holder having second slots formed therein which are positioned opposite the second coating-material inlet channels and second radial bores formed therein which are in communication with the second slots, said die holder having an inwardly directed end shoulder formed therein;

a guide die positioned in the tapered portion of the bore in the die holder, said guide die having an axially extending inlet bore formed therein that extends from a first end toward a second end;

a first die nozzle positioned in the bore in the die holder at a position between an end wall of the guide die located at the second end thereof and the end shoulder formed in the die holder, said first die nozzle having a recess formed therein which merges into an axially extending nozzle bore, said first die nozzle being positioned relative to the guide die so as to form a first coating-material slot between facing end faces of the guide die and the first die nozzle, said first die nozzle having distribution channels formed therein which extend between and connect the first radial bores with the first coating-material slot to distribute coating material supplied from the first coating-material inlet channels around the fiber and to center the fiber in the first die nozzle;

an intermediate guide die positioned within the bore in the die holder between the end shoulder of the die holder and the first die nozzle, said intermediate guide die having an axially extending bore formed therein;

a second die nozzle positioned in the bore in the die holder between the end shoulder of the die holder and the intermediate guide die, said second die nozzle having a recess formed therein that merges with an axially extending nozzle bore, said second die nozzle being positioned relative to the intermediate guide die so as to form a second coating-material slot between facing end faces of the intermediate guide die and the second die nozzle, said second die nozzle having distribution channels formed therein which extend between and communicate the second radial bores with the second coating-material slot to distribute coating material supplied from the second coating-material inlet channels around the fiber and to center the fiber in the second die nozzle.

9. A cup according to claim 8, wherein said bore in the die holder includes a generally cylindrical first bore portion that merges with the tapered portion of the bore, a generally cylindrical second bore portion that is smaller in size then the first bore portion and that is connected to the first bore portion by a first shoulder, and a generally cylindrical third bore portion that is smaller in size than said second bore portion and that is connected to the second bore portion by way of said end shoulder.

10. A cup according to claim 9, wherein said first die nozzle is positioned in the first bore portion of the die holder, said intermediate guide die being in abutment with the first shoulder, and the second die nozzle being in abutment with the end shoulder.

11. A cup according to claim 8, wherein the distribution channels in the first and second die nozzles include circumferentially and uniformly disposed and radially extending bores which open into the recesses formed in the respective first and second die nozzles.

12. A cup according to claim 11, wherein the second end of the guide die includes an outwardly projecting frusto-conical part and the recess in the first die nozzle is frusto-conically shaped, the outwardly projecting frusto-conical part on the guide die being received in the frusto-conical recess in the first die nozzle but spaced therefrom to define the first coating-material slot.

13. A cup according to claim 11, wherein the end of the intermediate guide die that faces the second die nozzle includes an outwardly extending frusto-conical part and the recess in the second die nozzle is frusto-conically shaped, the outwardly projecting frusto-conical part on the intermediate guide die being received in the frusto-conical recess in the first die nozzle but spaced therefrom to define the second coating-material slot.

14. A cup according to claim 11, wherein said plurality of first coating-material inlet channels includes two coating-material inlet channels positioned diametrically opposite to one another, said plurality of second coating-material inlet channels including two coating-material inlet channels positioned diametrically opposite to one another.

15. A cup according to claim 8, wherein said first die nozzle is held in position within the bore in the die holder by way of screws.

16. A cup according to claim 8, including a sealing ring positioned between facing end faces of the first die nozzle and the intermediate guide die, and a sealing ring positioned in a groove formed in an outer peripheral surface of the die holder at a position between the first and second slots formed in the die holder.

* * * * *